US012762715B2

(12) United States Patent
Mao

(10) Patent No.: US 12,762,715 B2
(45) Date of Patent: Oct. 13, 2026

(54) METHOD AND APPARATUS FOR DETECTION AND TRACKING, AND STORAGE MEDIUM

(71) Applicant: Tencent Technology (Shenzhen) Company Limited, Shenzhen (CN)

(72) Inventor: Shuyuan Mao, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 641 days.

(21) Appl. No.: 17/976,287

(22) Filed: Oct. 28, 2022

(65) Prior Publication Data

US 2023/0047514 A1 Feb. 16, 2023

Related U.S. Application Data

(63) Continuation of application No. PCT/CN2022/079697, filed on Mar. 8, 2022.

(30) Foreign Application Priority Data

Mar. 17, 2021 (CN) ........................ 202110287909.X

(51) Int. Cl.
*G06T 7/246* (2017.01)
*G06V 10/25* (2022.01)
(Continued)

(52) U.S. Cl.
CPC .............. *G06T 7/246* (2017.01); *G06V 10/25* (2022.01); *G06V 10/44* (2022.01); *G06V 10/761* (2022.01);
(Continued)

(58) Field of Classification Search
None
See application file for complete search history.

(56) References Cited

U.S. PATENT DOCUMENTS 12,205,306 B2 * 1/2025 Lin .......................... G06T 7/277
2014/0334668 A1 11/2014 Saund
(Continued)

FOREIGN PATENT DOCUMENTS

CN 104992453 A 10/2015
CN 110111363 A 8/2019
(Continued)

OTHER PUBLICATIONS

Seo et al., "Effective and efficient human action recognition using dynamic frame skipping and trajectory rejection" (Year: 2017).*
(Continued)

*Primary Examiner* — SJ Park
(74) *Attorney, Agent, or Firm* — Sughrue Mion, PLLC

(57) ABSTRACT

In the field of video processing, a detection and tracking method and apparatus, and a storage medium, are provided. The method includes: performing feature point analysis on a video frame sequence, to obtain feature points on each video frame thereof; performing target detection on an extracted frame through a first thread based on the feature points, to obtain a target box in the extracted frame; performing target box tracking in a current frame through a second thread based on the feature points and the target box in the extracted frame, to obtain a result target box in the current frame; and outputting the result target box. As the target detection and the target tracking are divided into two threads, a tracking frame rate is unaffected by a detection algorithm, and the target box of the video frame can be outputted in real time, improving real-time performance and stability.

18 Claims, 10 Drawing Sheets

(51) Int. Cl.
*G06V 10/44* (2022.01)
*G06V 10/74* (2022.01)

(52) U.S. Cl.
CPC .............. *G06T 2207/10016* (2013.01); *G06V 2201/07* (2022.01)

(56) References Cited

U.S. PATENT DOCUMENTS

| | | | | |
|---|---|---|---|---|
| 2014/0369555 | A1* | 12/2014 | Zhong | G06T 7/20 382/103 |
| 2018/0374233 | A1* | 12/2018 | Zhou | G06F 18/22 |
| 2020/0409996 | A1* | 12/2020 | Zhang | G06F 16/785 |
| 2021/0264619 | A1* | 8/2021 | Grancharov | G06T 19/006 |

FOREIGN PATENT DOCUMENTS

| | | | |
|---|---|---|---|
| CN | 110610510 | A | 12/2019 |
| CN | 110799984 | A | 2/2020 |
| CN | 110930434 | A | 3/2020 |
| CN | 113706576 | A | 11/2021 |

OTHER PUBLICATIONS

International Search Report of PCT/CN2022/079697 dated May 19, 2022 [PCT/ISA/210].

Office Action issued Dec. 6, 2025 in CN Application No. 202110287909.X.

* cited by examiner

METHOD AND APPARATUS FOR DETECTION AND TRACKING, AND STORAGE MEDIUM

CROSS-REFERENCE TO RELATED APPLICATIONS

This application is a bypass continuation application of International Application No. PCT/CN2022/079697, filed Mar. 8, 2022, which claims priority to Chinese Patent Application No. 202110287909.X, filed on Mar. 17, 2021, each of which is incorporated herein by reference in its entirety.

BACKGROUND

1. Field

This application relates to the field of video processing, and relates to but is not limited to a detection and tracking method and apparatus, a device, a storage medium, and a computer program product.

2. Description of Related Art

To implement a real-time analysis of a video stream, it is necessary to detect and track an object of a specific type (such as a moving human body) in video frames, and output a bounding box and the type of the object in real time.

In the related art, the method of detecting each video frame of a video stream is adopted. That is, by detecting a bounding box of an object in each video frame, bounding boxes of objects in adjacent video frames are matched and associated based on types.

However, it is often time-consuming to detect each video frame, and it is difficult to ensure the real-time output of the bounding box and type of the object.

SUMMARY

Embodiments of this disclosure provide a detection and tracking method and apparatus, a device, a storage medium, and a computer program product, which can improve the real-time performance and stability of target detection and tracking. Technical solutions include the following:

In accordance with certain embodiments of the present disclosure, a detection and tracking method is provided. The detection and tracking method may be performed by at least one processor. The detection and tracking method may include performing feature point analysis on a video frame sequence, to obtain feature points on each video frame in the video frame sequence. The detection and tracking method may further include performing target detection on an extracted frame through a first thread based on the feature points, to obtain a target box in the extracted frame, the extracted frame being a video frame extracted in the video frame sequence based on a target step size. The detection and tracking method may further include performing target box tracking in a current frame through a second thread based on the feature points and the target box in the extracted frame, to obtain a result target box in the current frame. The detection and tracking method may further include outputting the result target box in the current frame.

In accordance with other embodiments of the present disclosure, a detection and tracking apparatus is provided. The detection and tracking apparatus may include at least one memory configured to store computer program code.

The detection and tracking apparatus may further include at least one processor configured to operate as instructed by the computer program code. The computer program code may include analysis code configured to cause the at least one processor to perform feature point analysis on a video frame sequence, to obtain feature points on each video frame in the video frame sequence. The computer program code may further include detection code configured to cause the at least one processor to perform target detection on an extracted frame through a first thread based on the feature points, to obtain a target box in the extracted frame, the extracted frame being a video frame extracted in the video frame sequence based on a target step size. The computer program code may further include tracking code configured to cause the at least one processor to perform target box tracking in a current frame through a second thread based on the feature points and the target box in the extracted frame, to obtain a result target box in the current frame. The computer program code may further include output code configured to cause the at least one processor to output the result target box in the current frame.

In accordance with still other embodiments of the present disclosure, a non-transitory computer-readable storage medium is provided. The non-transitory computer-readable storage medium may store computer-readable instructions. The computer-readable instructions, when executed by at least one processor, may cause the at least one processor to perform feature point analysis on a video frame sequence, to obtain feature points on each video frame in the video frame sequence. The computer-readable instructions may further cause the at least one processor to perform target detection on an extracted frame through a first thread based on the feature points, to obtain a target box in the extracted frame, the extracted frame being a video frame extracted in the video frame sequence based on a target step size. The computer-readable instructions may further cause the at least one processor to perform target box tracking in a current frame through a second thread based on the feature points and the target box in the extracted frame, to obtain a result target box in the current frame. The computer-readable instructions may further cause the at least one processor to output the result target box in the current frame.

Beneficial effects brought by the technical solutions provided in the embodiments of this disclosure may include the following:

Embodiments of the disclosed method may divide the target detection and the target tracking into two threads. As such, a tracking frame rate may be unaffected by a detection algorithm. Even if the detection thread takes a long time, a terminal may still output the target box of each video frame.

Embodiments of the disclosed method may also implement a target detection process for extracted frames.

As such, detection of all video frames may be made unnecessary, which may reduce the time spent on the detection process, enable outputting of the target box of the video frame in real time, and improve the real-time performance and stability of the target detection and tracking.

BRIEF DESCRIPTION OF THE DRAWINGS

To describe the technical solutions of the embodiments of this disclosure more clearly, the following briefly introduces the accompanying drawings required for describing the embodiments. The accompanying drawings in the following description depict only some embodiments of the disclosure, and a person of ordinary skill in the art may still derive other embodiments from these accompanying drawings without creative efforts.

DETAILED DESCRIPTION

To make objectives, technical solutions, and advantages of this disclosure clearer, the following further describes implementations of this disclosure in detail with reference to the accompanying drawings. It is to be understood that the specific embodiments described herein are only used for explaining the disclosure, and are not used for limiting the disclosure.

First, terms used in the descriptions of certain embodiments of this disclosure are briefly introduced.

Detection and tracking: Target detection means scanning and searching for a target in an image and a video (a series of images), that is, locating and identifying the target in a scene. Target tracking means tracking a moving feature of a target in a video without identifying the tracking target. Therefore, image detection and tracking may be widely applied to target identification and tracking in computer vision, for example, to target detection and tracking in an automatic driving scene.

First thread: The first thread refers to a detection thread, which outputs a target box and type of a detected object by detecting the box and the object in an input video frame. In some embodiments, in response to the input video frame, an object in the video frame is detected through an object detection algorithm, and a target box and type of the object are outputted. For example, a one-stage (a target detection method) algorithm, a two-stage (a target detection method) algorithm, or an anchor-free (a target detection method) algorithm may be used to detect the video frame.

Second thread: The second thread refers to a tracking thread, which implements tracking for a target box through matching pairs of target feature points. In some embodiments, a target box of a previous frame includes feature points x1, x2, and x3, whose coordinates in the previous frame are a, b, and c respectively. Coordinates of the feature points x1, x2, and x3 in the current frame are a', b', and c' respectively. By calculating the displacements and scales of a, b, c and a', b', c', the displacements and scales of the target box of the current frame and the target box of the previous frame are calculated. Therefore, the target box of the current frame is obtained.

Third thread: The third thread refers to a motion analysis thread, which outputs feature points of each video frame by extracting feature points in an initial frame and tracking the feature points. In some embodiments, a corner detection algorithm (such as Harris algorithm), a features from accelerated segment test (FAST) algorithm, or a good feature to tracker (GFTT) algorithm may be used for feature point extraction. In some embodiments, an optical flow tracking algorithm may be used to track feature points of the previous frame of the current frame. For example, the optical flow tracking algorithm (such as Lucas-Kanade algorithm) may be used to track the feature points of the previous frame of the current frame.

Figure 1:
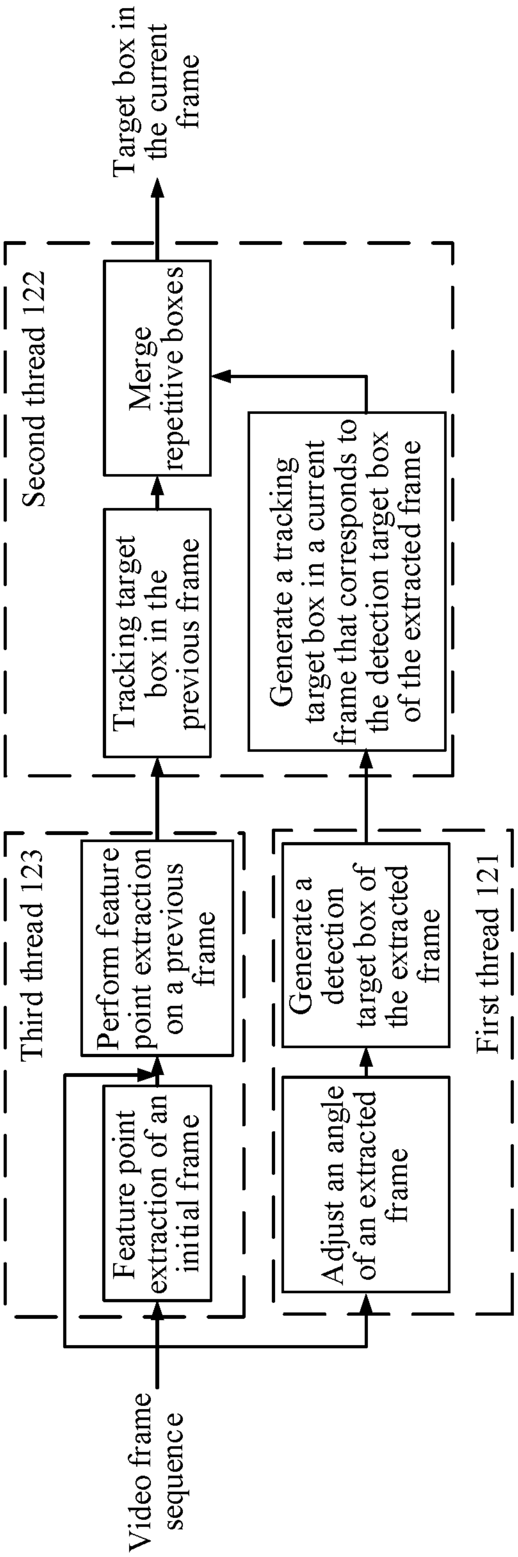
FIG. 1 is a diagram illustrating a multi-target detection and tracking system, according to an exemplary embodiment of this disclosure.

FIG. 1 is a diagram illustrating a multi-target detection and tracking system according to an exemplary embodiment of this disclosure. The multi-target detection and tracking system is provided with three processing threads. A first thread 121 is configured to detect a target in an extracted frame, to obtain a detection target box of the extracted frame. A second thread 122 is configured to track a motion trajectory of a target box in a previous frame of a current frame, and combine the target box in the previous frame with the detection target box of the extracted frame, to obtain a target box of the current frame. A third thread 123 is configured to perform feature point extraction on the initial frame, to obtain feature points on the initial frame, and track feature points of the previous frame of the current frame, to obtain feature points of the current frame (each frame).

In response to input of each video frame to the third thread 123, feature point extraction and tracking are performed, to obtain each video frame including feature points, and each video frame is inputted to the second thread 122.

In response to input of an extracted frame to the first thread 121, a direction of the extracted frame is adjusted, and the adjusted extracted frame is detected, to obtain a detection target box of the extracted frame, and the detection target box is inputted to the second thread 122.

If each video frame including the feature points is inputted to the second thread 122 and there is a target box in the previous frame, the second thread 122 obtains a tracking target box of the current frame based on the previous frame.

When the second thread 122 does not receive the detection target box of the latest extracted frame inputted by the first thread 121, the tracking target box of the current frame obtained by the second thread 122 is used as the target box of the current frame, and the target box of the current frame is outputted.

When the second thread 122 receives the detection target box of the latest extracted frame inputted by the first thread 121, a tracking target box of the detection target box is obtained in the current frame by tracking the detection target box in the current frame. If the tracking target box, in the current frame, of the detection target box and a tracking target box of the previous frame are determined to be repetitive, they are merged to obtain the target box of the current frame. The target box of the current frame is outputted as a result target box for the current frame.

In some embodiments, the multi-target detection and tracking system may run at least on an electronic device, which may be a server, a server group, or a terminal. That is, the multi-target detection and tracking system may at least run on the terminal, or run on the server, or run on the terminal and the server. The detection and tracking method of the embodiments of this disclosure may be implemented by the terminal, or by the server or the server group, or by interaction between the terminal and the server.

The detection target box or the tracking target box may be referred to as a target box for short.

A person skilled in the art may learn that there may be more or fewer terminals and servers. For example, there may be only one terminal, or there may be dozens of or hundreds of terminals or more. There may be only one server, or there may be dozens of or hundreds of servers or more. The quantity and the device type of the terminals and the quantity of the servers are not limited in the embodiments of this disclosure.

The following embodiments use the multi-target real-time detection and tracking system applied to the terminal as an example for description.

Figure 2:
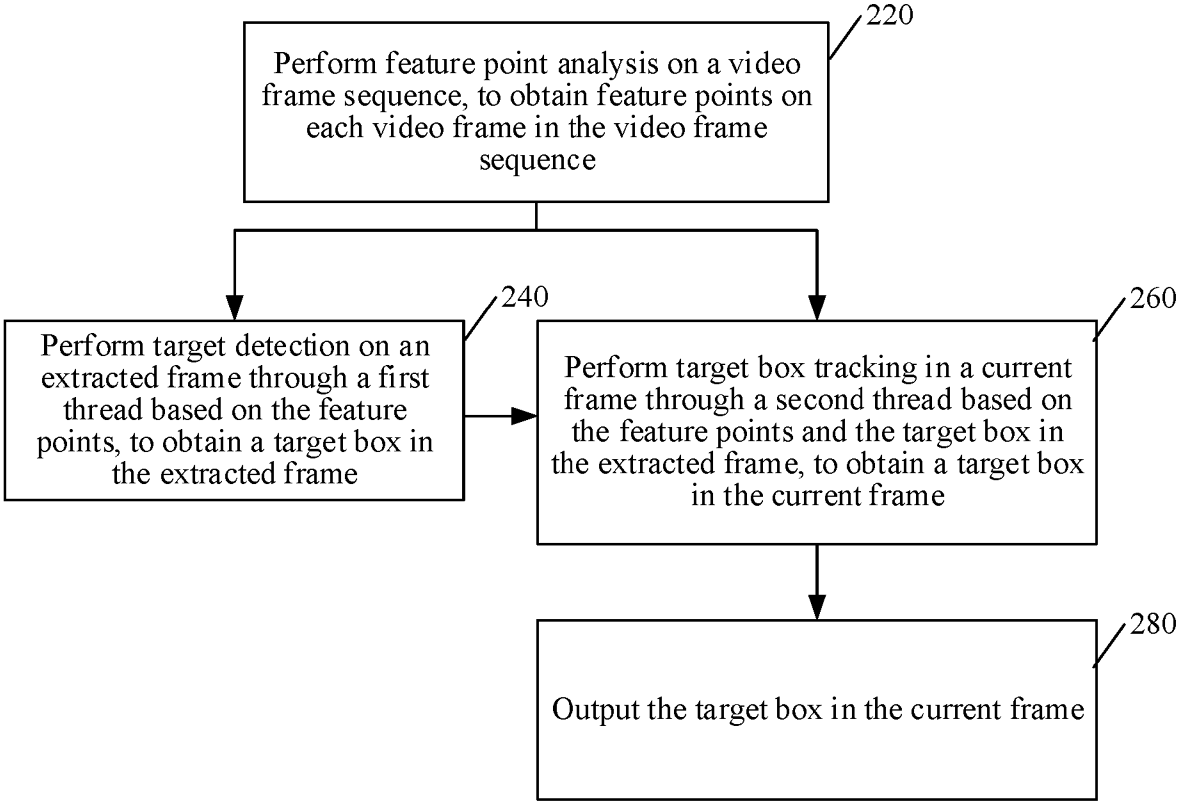
FIG. 2 is a flowchart illustrating a detection and tracking method, according to an exemplary embodiment of this disclosure.

To achieve real-time detection and tracking for a plurality of targets, the method shown in FIG. 2 is adopted.

FIG. 2 is a flowchart illustrating a detection and tracking method according to an exemplary embodiment of this disclosure. Using the method applied to the multi-target detection and tracking system illustrated in FIG. 1 as an example, the method includes the following operations:

Operation 220: Perform feature point analysis on a video frame sequence, to obtain feature points on each video frame in the video frame sequence.

In the embodiments of this disclosure, in response to the input video frame sequence, the terminal performs feature point analysis on the video frame sequence, to obtain the feature points on each video frame in the video frame sequence. The feature point refers to a pixel in a video frame that has a distinct feature and can effectively reflect an essential feature of the video frame, and the feature point can identify a target object in the video frame. In some embodiments, by matching different feature points, target object matching may be completed. That is, the target object is identified and classified.

In some embodiments, the feature point is a point with rich local information obtained through algorithm analysis. For example, the feature point exists in a corner of an image or a region in which a texture changes drastically. It is worth noting that the feature point has scale invariance, that is, a uniform property that can be identified in different images.

The feature point analysis refers to feature point extraction and feature point tracking on the input video frame. In the embodiments of this disclosure, in response to the input video frame sequence, the terminal performs feature point extraction on an initial frame, and obtains tracking feature points of a next frame through feature point tracking, to sequentially obtain feature points of all the video frames.

In some embodiments, a Harris algorithm or variant may be used for feature point extraction. That is, a fixed window is arranged in the initial video frame, and the window is used to slide in the image in any direction. Gray levels of a pixel in the window before and after the sliding are compared to obtain a gray level change. If there is sliding in any direction, and the gray level change of the pixel is greater than a gray level change threshold, or any pixel in a plurality of pixels which has a gray level change greater than a gray level change of any other pixel in the plurality of pixels is determined as the feature point.

In some embodiments, a feature point extraction algorithm (such as FAST-9 algorithm) may be used for feature point extraction. That is, by each pixel on the initial video frame is detected, when the pixel meets a specific condition, the pixel is determined as a feature point. The specific condition is at least as follows: A quantity of target adjacent pixels whose absolute values of pixel differences with the pixel exceed a pixel difference threshold is determined, and it is determined whether the quantity is greater than or equal to a quantity threshold. The specific condition is met when the quantity is greater than or equal to the quantity threshold. For example, there are 16 pixels on a circle with a radius of 3 and a pixel P as the center. Pixel differences between the four pixels on the top, bottom, left and right of the circle (namely, the target adjacent pixels of the pixel P) and the pixel P are calculated. Assuming that the quantity threshold is 3, if at least three of the absolute values of the four pixel differences exceed a pixel difference threshold, further judgment is performed; otherwise, it is determined that the pixel P is not a feature point. Based on the further judgment for the pixel P, pixel differences between the 16 pixels on the circle and P are calculated. If absolute values of at least 9 pixel differences in the 16 pixel differences exceed the pixel difference threshold, the pixel P is determined as the feature point.

In some embodiments, a Lucas-Kanade optical flow algorithm is used to track the feature points of the previous frame.

Operation 240: Perform target detection on an extracted frame through a first thread based on the feature points, to obtain a target box in the extracted frame.

The extracted frame is a video frame extracted in the video frame sequence by using a target step size. The target step size is a frame interval for extracting frames from the video frame sequence. If the target step size is 2, one video frame is extracted from every two video frames. In some embodiments, the target step size is a fixed value. For example, frames are extracted from the video frame sequence at a target step size of 2. In some embodiments, the target step size may be a variable. That is, at each stage, the target step size may be determined or otherwise selected as one of many suitable target step sizes. In one example, the 0th frame, the third frame, the seventh frame, and the twelfth frame are extracted. The target step size for the second and first extraction is 3, the target step size for the third and second extraction is 4, and the target step size for the fourth and third extraction is 5.

In some embodiments, the target step size may be set according to the time consumed by a detection algorithm. For example, if it takes a duration of three frames to detect each video frame, the terminal sets the target step size to 3.

In some embodiments, the step size of 3 may be used to extract frames from the video frame sequence. The first thread is configured to detect a target of the extracted frame, to obtain a detection target box of the extracted frame. Schematically, a one-stage algorithm, a two-stage algorithm, or an anchor-free algorithm may be used to detect the video frame.

For example, the detection algorithm usually takes a duration of more than one frame. That is, it is impossible to detect each video frame. Based on this, the technical solutions provided in the embodiments of this disclosure perform multi-thread detection and tracking on the video frame sequence.

Figure 3:
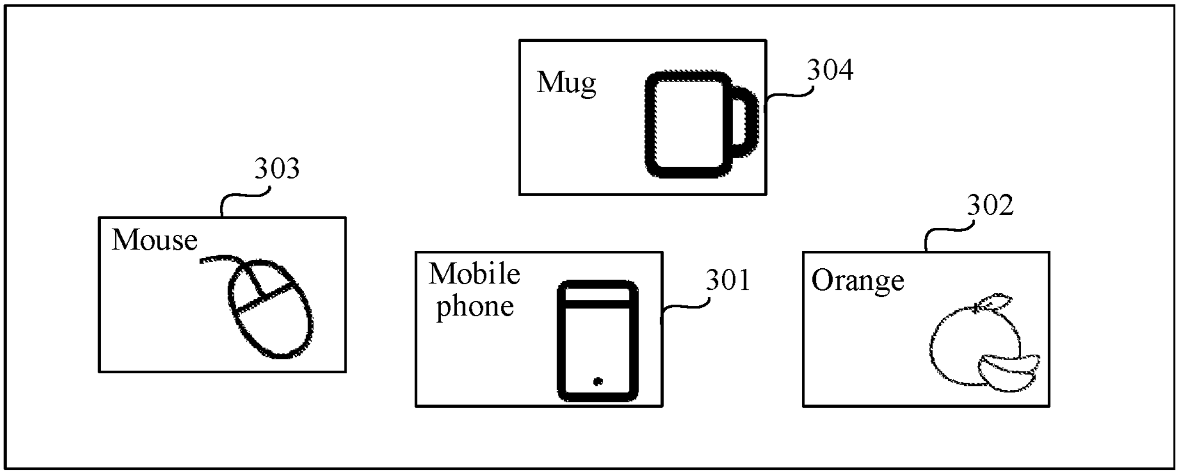
FIG. 3 depicts illustrative examples of target boxes, according to an exemplary embodiment of this disclosure.

The target box is used to identify an object. In some embodiments, the target box is embodied by a bounding box of the object, and type information of the object is displayed within the bounding box. FIG. 3 depicts illustrative examples of target boxes, according to an exemplary embodiment of this disclosure; namely, a target box 301 of a mobile phone, a target box 302 of an orange, a target box 303 of a mouse, and a target box 304 of a mug. The four target boxes not only include the bounding boxes of the objects, but also display the names of the objects in the bounding boxes. In some embodiments, the target box is embodied by a sticker of an object. That is, a sticker is added around the object to make the video frame more interesting. In the embodiments of this disclosure, the type of the target box is not limited.

In the embodiments of this disclosure, the target box includes the tracking target box and the detection target box. The tracking target box refers to a target box obtained by tracking the target box of the previous frame. The detection target box refers to a target box obtained by detecting the video frame.

Operation 260: Perform target box tracking in a current frame through a second thread based on the feature points and the target box in the extracted frame, to obtain a target box in the current frame.

Figure 4:
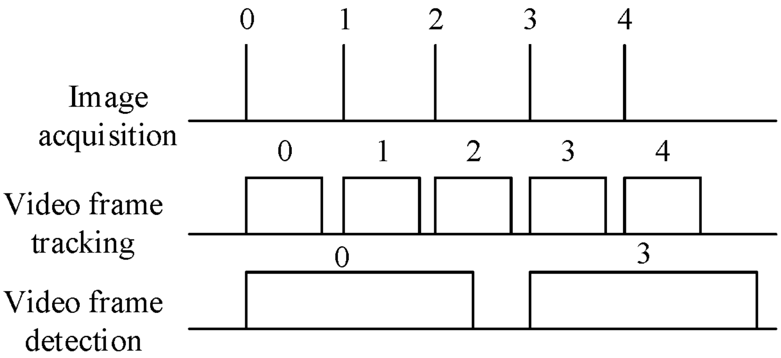
FIG. 4 is a diagram illustrating an example time sequence relationship of a multi-target real-time detection system, according to an exemplary embodiment of this disclosure.

To discuss the function of the second thread, a time sequence relationship of the multi-target real-time detection system is first introduced. FIG. 4 is a diagram illustrating an example time sequence relationship of a multi-target real-time detection system according to an exemplary embodiment of this disclosure. As shown in FIG. 4, a duration of an operation of video frame tracking is less than an interval of video frame acquisition (that is, the image acquisition shown in FIG. 4), and the tracking operation may thereby be performed on each video frame. However, a detection frame rate (that is, the video frame detection shown in FIG. 4) is relatively low, and it is impossible to perform image detection on each video frame. Therefore, image detection is performed on the extracted frames. The extraction step size in the example of FIG. 4 is three. When the tracking thread finishes processing the second video frame, the detection for the 0-th video frame has just been completed. In this case, the target box detected in the 0-th frame needs to be “transferred” to the second frame, so as to be fused with the tracking box of the second frame, which is equivalent to perform tracking from the 0-th frame to the second frame again.

In some embodiments, target box tracking is performed on the current frame through the second thread based on the feature points and the target box in the extracted frame, to obtain the target box in the current frame. This is divided into the following two cases:

In the first case, if the first thread does not output a first target box, a second target box is tracked in the current frame through the second thread based on the feature points, to obtain the target box in the current frame. The first target box is a target box detected in a latest extracted frame before the current frame in the video frame sequence, and the second target box is a target box tracked in the previous frame of the current frame. For example, if there is no target box in the previous frame of the current frame, the current frame does not have a tracking target box obtained based on the target box of the previous frame.

With reference to FIG. 4, when the current input video frame is the first frame, the first thread does not output a detection box of the 0-th frame. In this case, the second thread tracks the target box in the 0-th frame based on the feature points of the 0-th frame and the feature points of the first frame, to obtain the tracking target box of the first frame. In this case, the tracking target box is the target box of the first frame.

It is worth noting that when the 0-th frame is the initial frame, there is no target box in the 0-th frame. Therefore, the first frame does not have a tracking target box obtained based on the 0-th frame. When the 0-th frame is not the initial frame, the target box in the 0-th frame is obtained by tracking the target box of the previous frame of the 0-th frame.

In some embodiments, the target box in the 0-th frame is tracked based on the feature points of the 0-th frame and the feature points of the first frame, to obtain the tracking target box of the first frame. This process may be implemented through the following method: First, tracking feature points of the current frame and target feature points of the previous frame of the current frame are acquired. Then, the tracking feature points of the current frame and the target feature points of the previous frame are formed into a plurality of sets of feature point matching pairs through the second thread. The target feature points are feature point located in the second target box. A plurality of sets of feature point offset vectors corresponding to the plurality of sets of feature point matching pairs are determined. A plurality of sets of feature point offset vectors corresponding to the plurality of sets of feature point matching pairs can be obtained through calculation. After that, a target box offset vector of the second target box is calculated based on the plurality of sets of feature point offset vectors. Finally, the second target box is shifted according to the target box offset vector, to obtain the target box in the current frame.

For example, the target feature points of the 0-th frame are x1, x2, and x3 whose coordinates in the 0-th frame are a, b, and c respectively. The tracking feature points in the first frame corresponding to the feature points x1, x2, and x3 are x1', x2', and x3' whose coordinates in the first frame are a', b', and c' respectively. The feature points x1 and x1' form a feature point matching pair; x2 and x2' form a feature point matching pair; and x3 and x3' form a feature point matching pair. The plurality of sets of feature point offset vectors are obtained, namely (a, a'), (b, b'), and (c, c'). It is assumed that the coordinates of the target box of the 0-th frame are expressed as m.

In some embodiments, the target box offset vector is an average vector of the plurality of sets of feature point offset vectors. The coordinates of the target box of the first frame are m+((a, a')+(b, b')+(c, c'))/3.

In some embodiments, the target box offset vector is a weighted vector of the plurality of sets of feature point offset vectors. For example, a weight of the offset vector (a, a') is 0.2, a weight of the offset vector (b, b') is 0.4, and a weight of the offset vector (c, c') is 0.4. In this case, the coordinates of the target box of the first frame are m+(0.2 (a, a')+0.4 (b, b')+0.4 (c, c')).

In the second case, if the first thread outputs the first target box, the first target box and the second target box are tracked in the current frame through the second thread based on the feature points, to obtain the target box in the current frame. The first target box is a target box detected in a latest extracted frame before the current frame in the video frame sequence, and the second target box is a target box tracked in the previous frame of the current frame.

In some embodiment, the foregoing method includes the following steps: tracking the first target box in the current frame through the second thread based on the feature points, to obtain a first tracking box; tracking the first target box in the current frame through the second thread based on the feature points, to obtain a first tracking box; and merging repetitive boxes in the first tracking box and the second tracking box, to obtain the target box in the current frame.

With reference to FIG. 4, when the current frame is the second frame, the first thread outputs a detection target box of the 0-th frame. The detection target box of the 0-th frame is tracked through the second thread, to obtain the first tracking box. The target box of the first frame is tracked in the second frame through the second thread based on the feature points, to obtain the second tracking box. If the first tracking box and the second tracking box are repetitive, they are merged to obtain the target box in the second frame.

The tracking for the target box based on the feature points have been described above and details are not described herein again.

Operation 280: Output the target box in the current frame.

Through the foregoing steps, the terminal obtains the target box of the current frame and outputs the target box of the current frame.

In conclusion, the foregoing method divides the detection and the tracking into two threads. The detection algorithm does not affect a tracking frame rate. Even if a detection thread takes a long time, the terminal can still output the target box of each video frame. This method can output the target box of the video frame in real time, and the delay of the real-time output does not increase significantly as the quantity of the target boxes increases. Moreover, the target detection process is implemented for the extracted frames. Therefore, it is unnecessary to detect all video frames, which can reduce the time spent on the detection process, thereby outputting the target box of the video frame in real time, and improving the real-time performance and stability of the target detection and tracking.

Figure 5:
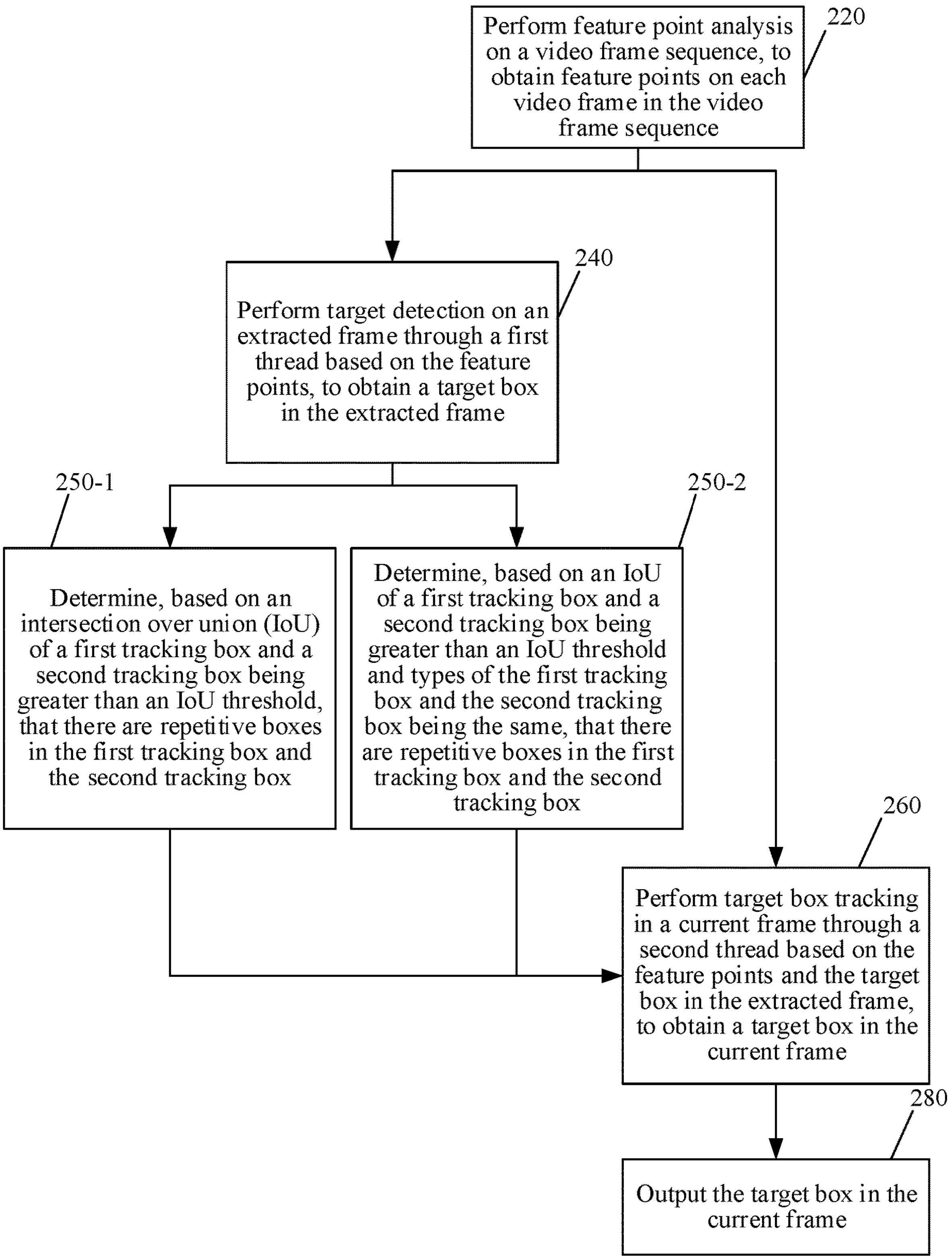
FIG. 5 is a flowchart illustrating a detection and tracking method, according to another exemplary embodiment of this disclosure.

To implement the judgment for the repetitive boxes, a detection and tracking method may be used. FIG. 5 is a flowchart illustrating a detection and tracking method according to an exemplary embodiment of this disclosure. Operations 220, 240, 260, and 280 have been described above, and details are not described herein again. Before the repetitive boxes in the first tracking box and the second tracking box are merged to obtain the target box in the current frame in Operation 260, the following steps are further included:

Operation 250-1: Determine that there are the repetitive boxes in the first tracking box and the second tracking box, in a case that an intersection over union (IoU) of the first tracking box and the second tracking box being greater than an IoU threshold.

In the embodiments of this disclosure, the first target box is tracked in the current frame through the second thread based on the feature points to obtain the first tracking box. The second target box is tracked in the current frame through the second thread based on the feature points to obtain the second tracking box.

An IoU is a standard for measuring the accuracy of a corresponding object in a specific data set. In the embodiments of this disclosure, the standard is used to measure the correlation between the tracking target box and the detection target box. Higher correlation indicates a higher value of the IoU. For example, a region in which the tracking target box is located is S1, and a region in which the detection target box is located is S2. The intersection of S1 and S2 is S3, and S1 and S2 form a region S4. In this case, the IoU is S3/S4.

In some embodiments, the IoU of the first tracking box and the second tracking box in the current frame is calculated. The terminal stores the IoU threshold in advance. For example, the IoU threshold is 0.5. When the IoU of the first tracking box and the second tracking box in the current frame is greater than 0.5, it is determined that there are the repetitive boxes in the first tracking box and the second tracking box. If the IoU of the first tracking box and the second tracking box in the current frame is not greater than 0.5, it is determined that there are no repetitive boxes in the first tracking box and the second tracking box.

In the embodiments of this disclosure, regardless of whether the types of the first tracking box and the second tracking box are the same, it may be considered that there are the repetitive boxes in the first tracking box and the second tracking box.

Operation 250-2: Determine that there are the repetitive boxes in the first tracking box and the second tracking box, in a case that the IoU of the first tracking box and the second tracking box is greater than the IoU threshold and types of the first tracking box and the second tracking box are the same.

In certain embodiments, when the IoU of the first tracking box and the second tracking box in the current frame is greater than the IoU threshold of 0.5, and the types of the objects in the first tracking box and the second tracking box are the same, it is determined that there are repetitive boxes in the first tracking box and the second tracking box.

Operation 250-1 and Operation 250-2 are parallel steps. That is, judgment for the repetitive boxes can be implemented by performing Operation 250-1 only or Operation 250-2 only.

In certain embodiments based on FIG. 2, merging the repetitive boxes in Operation 260 includes at least one of the following methods:

Method 1: In response to the existence of the repetitive boxes in the first tracking box and the second tracking box, the first tracking box is determined as the target box of the current frame.

Based on Operation 250-1 and Operation 250-2, it is determined whether there are repetitive boxes in the first tracking box and the second tracking box. The first tracking box is determined as the target box of the current frame.

Method 2: In response to the existence of the repetitive boxes in the first tracking box and the second tracking box, a tracking box with a highest confidence in the first tracking box and the second tracking box is determined as the target box of the current frame.

Based on Operation 250-1 and Operation 250-2, it is determined whether there are repetitive boxes in the first tracking box and the second tracking box. The tracking box with the highest confidence in the first tracking box and the second tracking box is determined as the target box of the current frame.

In some embodiments, a target detection algorithm is used to output a confidence score of the target box. The terminal deletes a target box whose score is lower than a confidence threshold, and uses a tracking box whose confidence is greater than or equal to the confidence threshold as the target box of the current frame.

Method 3: In response to the existence of the repetitive boxes in the first tracking box and the second tracking box and the first tracking box being at a boundary of the current frame, the second tracking box is determined as the target box of the current frame.

Based on Operation 250-1 and Operation 250-2, it is determined whether there are repetitive boxes in the first tracking box and the second tracking box. When the first tracking box is at the boundary of the current frame, the second tracking box is determined as the target box of the current frame.

In some embodiments, when the target box is embodied as a bounding box of an object, and a detection target box obtained by detecting an adjacent extracted frame cannot completely enclose the entire object, that is, when the object cannot be completely displayed in the adjacent extracted frame, the second tracking box is determined as the target box of the current frame.

The foregoing methods 1, 2 and 3 are parallel methods. That is, the repetitive boxes can be merged by performing method 1 only, performing method 2 only or performing method 3 only.

In conclusion, the foregoing methods determine there are repetitive boxes in the current frame and merge the repetitive boxes, to ensure that the target boxes of the current frame are distinctive from each other and orderly, and avoid repetitive target boxes with the same function in the current frame.

Figure 6:
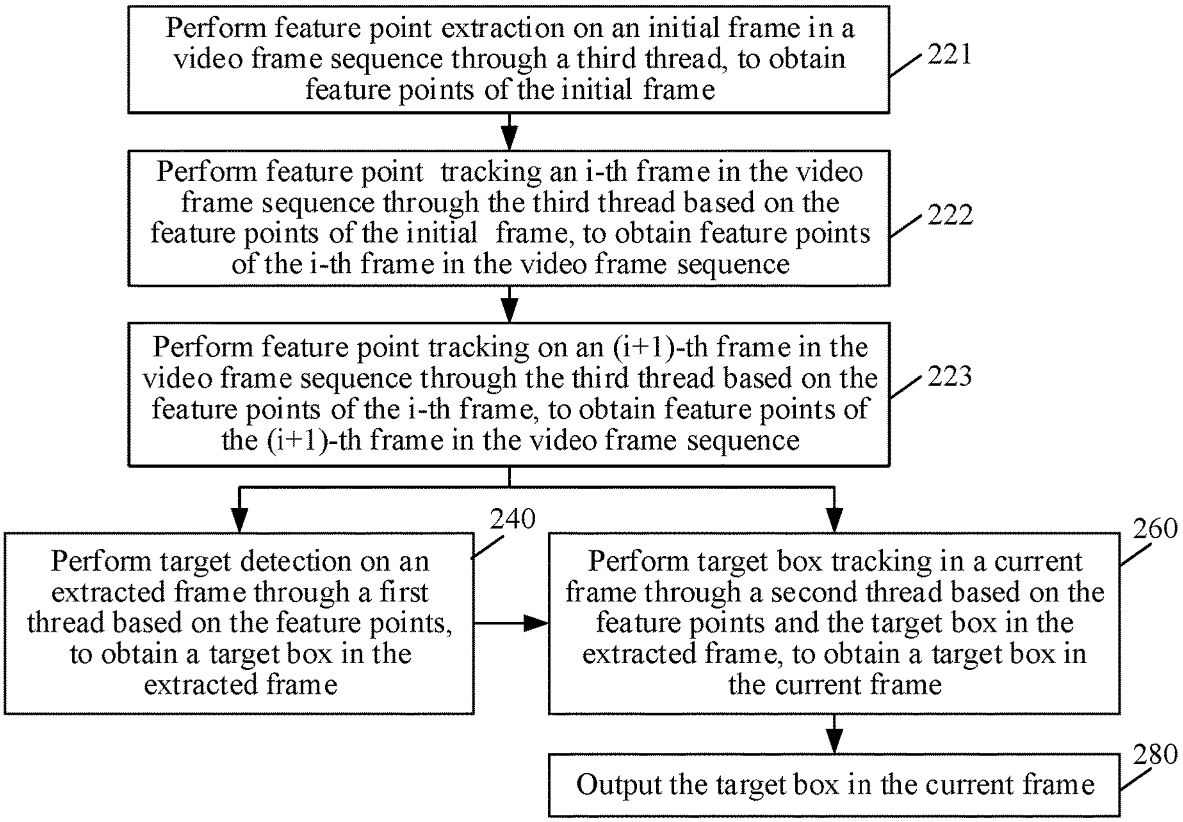
FIG. 6 is a flowchart illustrating a detection and tracking method, according to another exemplary embodiment of this disclosure.

To implement feature point extraction and tracking, another detection and tracking method may be used. FIG. 6 is a flowchart illustrating a detection and tracking method according to an exemplary embodiment of this disclosure. Operations 240, 260, and 280 have been described above, and details are not described herein again.

Operation 221: Perform feature point extraction on an initial frame in the video frame sequence through a third thread, to obtain feature points of the initial frame.

In some embodiments, with reference to FIG. 1, in a case that the terminal inputs the video frame sequence, feature point extraction is first performed on the initial frame through the third thread 123.

Operation 222: Perform feature point extraction on an i-th frame in the video frame sequence through the third thread based on the feature points of the initial frame, to obtain feature points of the i-th frame in the video frame sequence. The i-th frame is a video frame after the initial frame. A starting number of i is a frame number of the initial frame plus one, and i is a positive integer.

In some embodiments, with reference to FIG. 1, in a case that the terminal tracks the feature points of the initial frame through the third thread 123, the feature points of the i-th frame may be obtained. The i-th frame is a video frame after the initial frame, and the starting number of i is the frame number of the initial frame plus one. It is worth noting that the third thread 123 is only used for feature point extraction of the initial frame, but not for feature point extraction of the i-th video frame.

Operation 223: Perform feature point extraction on an (i+1)-th frame in the video frame sequence through the third thread based on the feature points of the i-th frame, to obtain feature points of the (i+1)-th frame in the video frame sequence.

In some embodiments, with reference to FIG. 1, in a case that the terminal tracks the feature points of the i-th frame through the third thread 123, the feature points of the (i+1)-th frame in the video frame sequence are obtained.

For example, optical flow tracking is performed on the feature points of the i-th frame through the third thread, to obtain the feature points of the (i+1)-th frame in the video frame sequence. For example, the Lucas-Kanade optical flow algorithm may be used to track the feature points of the previous frame.

Through Operation 221 to Operation 223, the feature points of the video frame sequence may be extracted and tracked. In some embodiments, the performing of the feature point tracking through the third thread based on the feature points of the i-th frame to obtain feature points of the (i+1)-th frame in the video frame sequence further includes deletion and supplement for the feature points of the (i+1)-th frame.

Deletion for the feature points of the (i+1)-th frame: In a case that a first feature point in the (i+1)-th frame meets a deletion condition, the first feature point in the (i+1)-th frame is deleted. The deletion condition includes at least one of the following:

(1) The first feature point is a feature point that fails to be tracked.

In some embodiments, feature point tracking is performed through the third thread based on the feature points of the i-th frame, to obtain the first feature point of the (i+1)-th frame in the video frame sequence. The first feature point is a feature point for which no feature point for forming a feature point matching pair can be found in the i-th frame, that is, a feature point that fails to be tracked.

(2) A distance between the first feature point and an adjacent feature point is less than a distance threshold.

In some embodiments, the terminal deletes the first feature point in the (i+1)-th frame in a case that the distance between the first feature point in the (i+1)-th frame and the adjacent feature point is less than a distance threshold D. For example, the distance threshold D is determined depending on the calculation amount and image size. For example, the distance threshold D ranges from 5 to 20.

Supplement for the feature points of the (i+1)-th frame: In a case that a target region in the (i+1)-th frame meets a supplement condition, a new feature point is extracted from the target region. The supplement condition includes: The target region is a region in which a feature point tracking result is empty.

In some embodiments, there are 50 feature points in the target region of the i-th frame. Through feature point tracking, there are 20 feature points in the target region of the (i+1)-th frame. In this case, it is determined that the feature point tracking result of the (i+1)-th frame is empty. In this case, the operation of extracting new feature points from the target region is performed. For the extraction method, reference may be made to Operation 220.

For example, the target region of the i-th frame is a "mobile phone" region. That is, a target box may be added to the "mobile phone" through 50 feature points. When there are only 20 feature points in the "mobile phone" region of the (i+1)-th frame, the terminal cannot add the target box to the mobile phone. In this case, new feature points need to be extracted from the "mobile phone" region, and then the terminal may add the target box to the mobile phone. It is worth noting that the foregoing third thread does not add the target box to the "mobile phone" region, but only indicates that the possibility of adding the target box to the mobile phone by the terminal. The operation of adding the target box to the "mobile phone" region is implemented in the second thread.

In conclusion, the foregoing methods implement the extraction for the initial frame and feature point tracking for the video frame. Besides, the methods improve the stability of the feature points of the adjacent frames by deleting and adding feature points, and ensure that the second thread can obtain the target box through the feature points of the adjacent frames.

Figure 7:
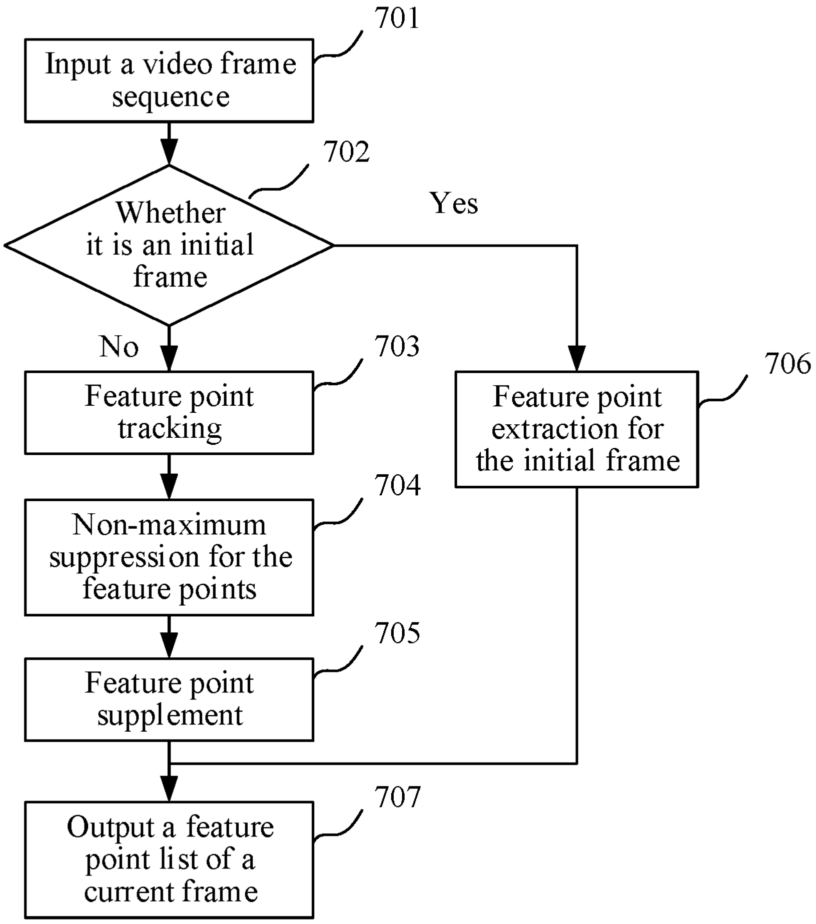
FIG. 7 is a flowchart illustrating a third thread, according to an exemplary embodiment of this disclosure.

In certain embodiments based on FIG. 2, the performing of the feature point analysis on a video frame sequence, to obtain feature points on each video frame in the video frame sequence may be implemented in a third thread. FIG. 7 is a flowchart illustrating a third thread according to an exemplary embodiment of this disclosure. A method of the third thread includes:

Operation 701: Input a video frame sequence.

In response to an operation of starting multi-target real-time detection, a terminal inputs the video frame sequence.

Operation 702: Determine whether a current frame is an initial frame.

Based on the video frame sequence inputted by the terminal, the terminal determines whether the current frame is the initial frame. If the current frame is the initial frame, Operation 706 is performed. If the current frame is not the initial frame, Operation 703 is performed.

Operation 703: Perform feature point tracking on a previous frame of the current frame to obtain a tracking result.

In a case that the current frame is not the initial frame, feature points of the previous frame are tracked through an optical flow tracking algorithm to obtain image coordinates of the feature points in the current frame. The optical flow tracking algorithm includes but is not limited to: Lucas-Kanade optical flow.

Operation 704: Perform non-maximum suppression on the feature points based on the tracking result.

The non-maximum suppression for the feature points means that the terminal deletes feature points that fail to be tracked, and when a distance between two feature points is less than a distance threshold, deletes one of the two feature points. A deletion policy includes but is not limited to: randomly deleting one of the feature points; and scoring the feature points based on a feature point gradient, and deleting a feature point with a lower score. For the distance threshold, refer to Operation 506.

Operation 705: Supplement feature points.

New feature points are extracted in response to a region without a tracking feature point in the current. For the method for extracting the new feature points, refer to Operation 706.

Operation 706: Perform feature point extraction on the initial frame, to obtain feature points of the initial frame.

In a case that the current frame is the initial frame, the terminal extracts the feature points of the initial frame. The terminal extracts the feature points in the initial frame, to ensure that a minimum interval between the feature points is not less than an interval threshold (the interval threshold is determined depending on the calculation amount and image size, which for example, may range from 5 to 20). The feature extraction method includes but is not limited to: Harris, FAST, Good Feature To Tracker and the like. The terminal assigns a feature point label to each new feature point, where the label increases from 0.

Operation 707: Output a feature point list of the current frame.

Based on Operation 701 to Operation 706, the feature point list of each video frame in the video frame sequence is outputted.

In certain embodiments based on FIG. 2, the performing of the target detection on an extracted frame through a first thread based on the feature points, to obtain a target box in the extracted frame may be implemented by the following method: The terminal inputs the extracted frame of the video frame sequence and outputs a detected bounding box and type of an object through the first thread. A target detection algorithm includes but is not limited to: a one-stage algorithm, a two-stage algorithm, an anchor-free algorithm and the like. In some embodiments, the terminal adjusts a direction of the extracted frame to be a gravity direction before the detection, to improve the detection effect.

Figure 8:
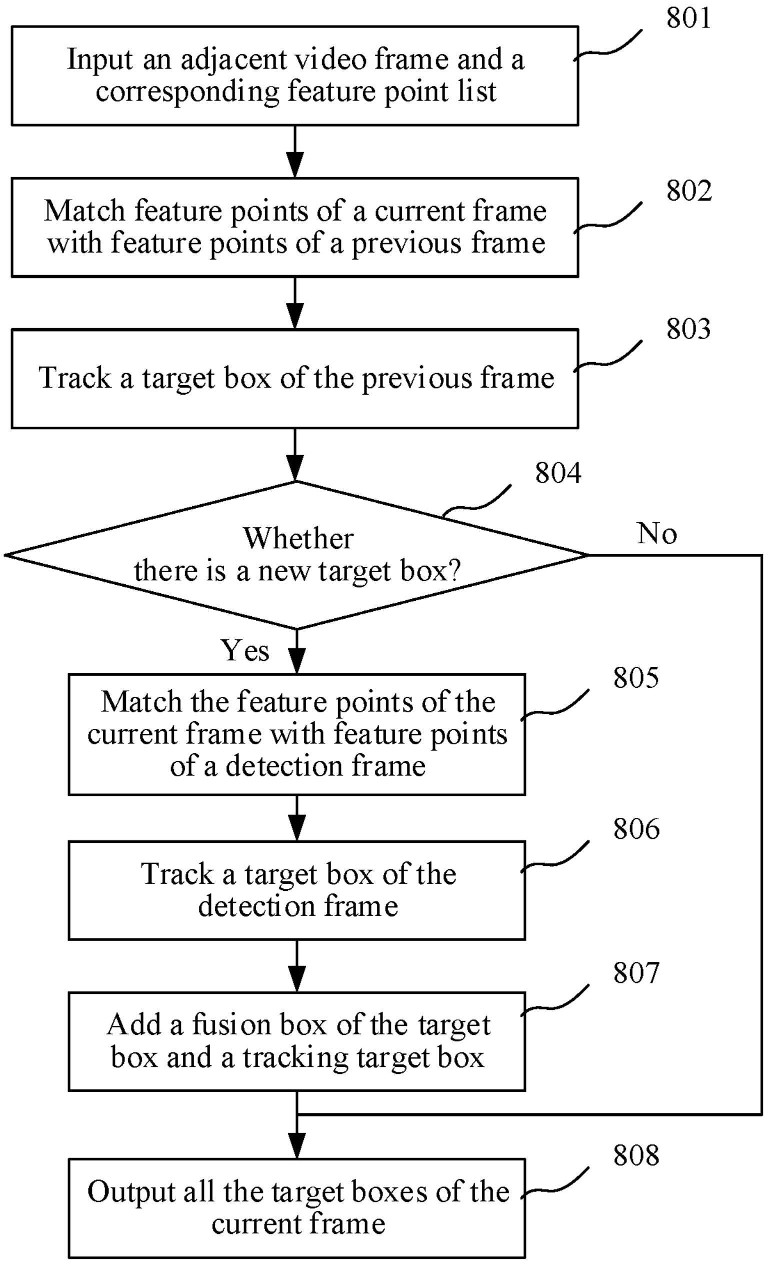
FIG. 8 is a flowchart illustrating a second thread, according to an exemplary embodiment of this disclosure.

In certain embodiments based on FIG. 2, the performing of the target box tracking in a current frame based on the feature points to obtain a target box in the current frame may be implemented by the second thread. FIG. 8 is a flowchart illustrating a second thread according to an exemplary embodiment of this disclosure. The method includes:

Operation 801: Input an adjacent video frame and a corresponding feature point list.

In response to the feature points of the video frame sequence outputted by the third thread, the terminal inputs the adjacent video frame and the corresponding feature point list to the second thread.

Operation 802: Match the feature points of the current frame with feature points of a previous frame.

The feature points of the current frame are matched with the feature points of the previous frame through feature point labels to obtain feature point matching pairs.

Operation 803: Track a target box of the previous frame.

Based on each target box of the previous frame, the terminal determines feature points in the target box of the previous frame, and calculates the displacement and scale, in the current frame, of the target box of the previous frame according to the feature point matching pairs. The calculation method includes but is not limited to: a median flow method, a homography matrix method and the like.

Operation 804: Determine whether there is a new target box.

The terminal determines whether the first thread outputs a detection target box. If so, Operation 805 is performed. If not, Operation 808 is performed.

Operation 805: March the feature points of the current frame with feature points of a detection frame.

In a case that the first thread outputs the detection target box, the terminal matches the feature points of the current frame and the detection frame through the feature point labels to obtain feature point matching pairs.

Operation 806: Track the target box of the detection frame.

Based on each target box of the detection frame, the terminal determines feature points in the target box, and calculates the displacement and scale of the detection target box in the current frame according to the feature point matching pairs. The calculation method includes but is not limited to: a median flow method, a homography matrix method and the like.

Operation 807: Add a fusion box of the target box and a tracking target box in the current frame.

Based on repeated detection, the tracking target box and the detection target box may overlap, and an overlap determining criterion is as follows:

(1) An IoU of the tracking target box and the detection target box is greater than an IOU threshold. For example, the IoU threshold may be 0.5.

(2) Object types of the tracking target box and the detection target box are the same.

After determining that the tracking target box and the detection target box overlap, the terminal performs an operation of fusing the overlapping boxes.

In some embodiments, when the tracking target box and the detection target box overlap, the two target boxes need to be fused into a target box through a policy, to obtain a fusion box. A fusion policy includes at least the following method: The target box of the current frame is the detection target box constantly. According to the target detection algorithm, the terminal obtains confidence scores of the tracking target box and the detection target box, and the terminal deletes a target box with a lower confidence score in the current frame. When the detection target box is close to the boundary of the current frame, the terminal determines that the object detection is incomplete. In this case, the terminal determines that the tracking target box is the target box of the current frame; otherwise, the terminal determines that the detection target box is the target box of the current frame.

Operation 808: Output all the target boxes in the current frame.

Based on Operation 801 to Operation 807, the terminal outputs all the target boxes in the current frame.

Figure 9:
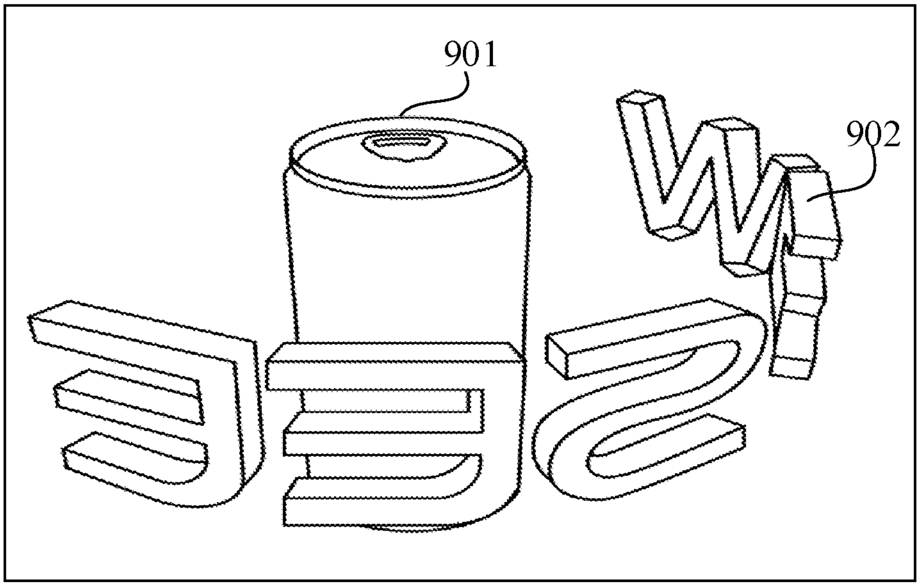
FIGS. 9 and 10 depict illustrative examples of video frames, according to exemplary embodiments of this disclosure.
Figure 10:
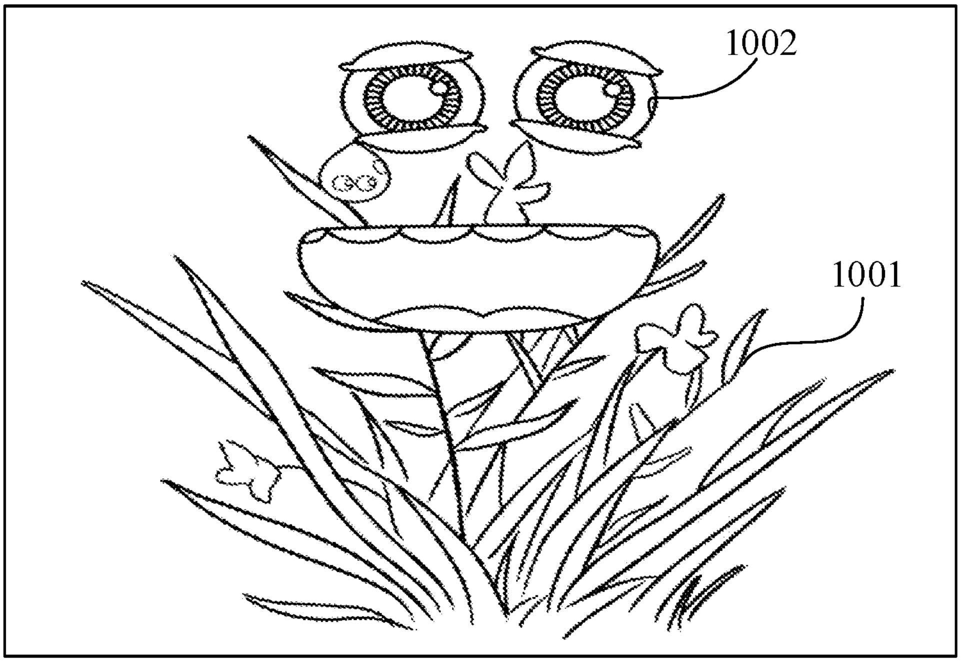

The following describes application scenarios of the embodiments of this disclosure:

In some embodiments, when a user uses the terminal to scan a specific type of object in a real environment, a 3D augmented reality (AR) special effect pops up on a display screen of the terminal. For example, FIGS. 9 and 10 depict illustrative examples of video frames according to exemplary embodiments of this disclosure. When the user uses the terminal to scan a drink 901 in FIG. 9, colored three-dimensional characters 902 appear around the drink 901. When the user uses the terminal to scan a plant 1001 in FIG. 10, a cartoon pendant 1002 pops up around the plant.

Figure 11:
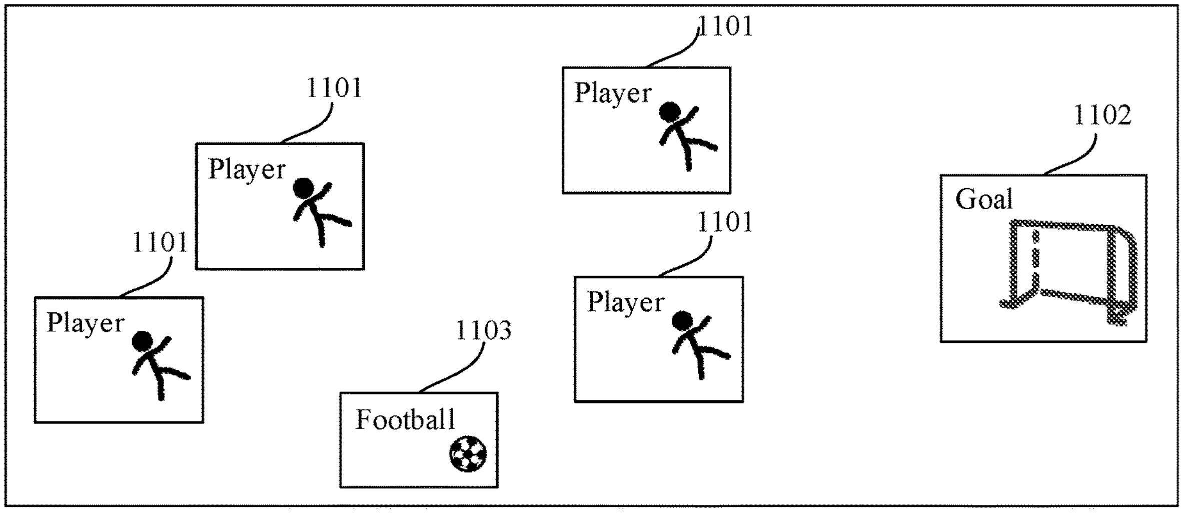
FIG. 11 depicts an illustrative example of a video frame with multiple target boxes, according to another exemplary embodiment of this disclosure.

FIG. 11 depicts an illustrative example of a video frame with multiple target boxes, according to still another exemplary embodiment of this disclosure. In response to input of a football match video being inputted, the terminal detects target boxes such as a player 1101, a goal 1102, and a football 1103, and tracks these targets in consecutive frames. Subsequent football match analysis may be performed based on the tracking result.

In some embodiments, the terminal performs feature point analysis on a video frame sequence of the football video, to obtain feature points on each video frame in the video frame sequence. By performing target detection on an extracted frame through a first thread based on the feature points, the terminal obtains a target box in the extracted frame. The extracted frame is a video frame extracted in the video frame sequence by using a target step size. By performing target box tracking in the current frame through a second thread based on the feature points, the terminal obtains a target box in the current frame. The terminal outputs the target box in the current frame.

Figure 12:
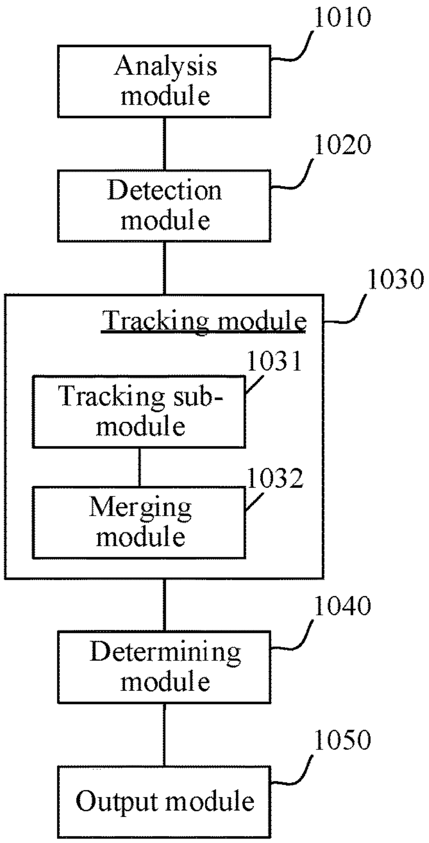
FIG. 12 is a structural block diagram illustrating a detection and tracking apparatus, according to an exemplary embodiment of this disclosure.

FIG. 12 is a structural block diagram illustrating a detection and tracking apparatus according to an exemplary embodiment of this disclosure. As shown in FIG. 12, the apparatus includes: an analysis module 1010, configured to perform feature point analysis on a video frame sequence, to obtain the feature points on each video frame in the video frame sequence; a detection module 1020, configured to perform target detection on an extracted frame through a first thread based on the feature points, to obtain a target box in the extracted frame, the extracted frame being a video frame extracted in the video frame sequence by using a target step size; a tracking module 1030, configured to perform target box tracking in a current frame through a second thread based on the feature points and the target box in the extracted frame, to obtain a target box in the current frame; and an output module 1050, configured to output the target box in the current frame.

In certain embodiments, the tracking module 1030 is further configured to track a second target box in the current frame through the second thread based on the feature points, to obtain the target box in the current frame, in a case that the first thread does not output a first target box.

In certain embodiments, the tracking module 1030 is further configured to track the first target box and the second target box in the current frame through the second thread based on the feature points, to obtain the target box in the current frame, in a case that the first thread outputs the first target box. The first target box is a target box detected in a latest extracted frame before the current frame in the video frame sequence, and the second target box is a target box tracked in the previous frame of the current frame.

In certain embodiments, the tracking module 1030 includes a tracking sub-module 1031 and a merging module 1032. The tracking sub-module 1031 is configured to track the first target box in the current frame through the second thread based on the feature points, to obtain a first tracking box.

In certain embodiments, the tracking sub module 1031 is further configured to track the second target box in the current frame through the second thread based on the feature points, to obtain a second tracking box.

In certain embodiments, the merging module 1032 is configured to merge repetitive boxes in the first tracking box and the second tracking box, to obtain the target box in the current frame.

In certain embodiments, the apparatus further includes a determining module 1040. The determining module 1040 is configured to determine that there are the repetitive boxes in the first tracking box and the second tracking box in a case that an IoU of the first tracking box and the second tracking box is greater than an IoU threshold.

In certain embodiments, the determining module 1040 is further configured to determine that there are the repetitive boxes in the first tracking box and the second tracking box, in a case that the IoU of the first tracking box and the second tracking box is greater than the IoU threshold and types of the first tracking box and the second tracking box are the same.

In certain embodiments, the determining module 1040 is further configured to determine the first tracking box as the target box of the current frame in response to the existence of the repetitive boxes in the first tracking box and the second tracking box.

In certain embodiments, the determining module 1040 is further configured to determine a tracking box with a highest confidence in the first tracking box and the second tracking box as the target box of the current frame in response to the existence of the repetitive boxes in the first tracking box and the second tracking box.

In certain embodiments, the determining module 1040 is further configured to determine the second tracking box as the target box of the current frame in response to the existence of the repetitive boxes in the first tracking box and the second tracking box, and the first tracking box being at a boundary of the current frame.

In certain embodiments, the tracking module 1030 is further configured to acquire tracking feature points of the current frame and target feature points of the previous frame of the current frame, and form the tracking feature points of the current frame and the target feature points of the previous frame into a plurality of sets of feature point matching pairs through the second thread. The target feature points are feature points located in the second target box.

In certain embodiments, the tracking module 1030 is further configured to determine a plurality of sets of feature point offset vectors of the plurality of sets of feature point matching pairs.

In certain embodiments, the tracking module 1030 is further configured to calculate a target box offset vector of the second target box based on the plurality of sets of feature point offset vectors.

In certain embodiments, the tracking module 1030 is further configured to shift the second target box according to the target box offset vector, to obtain the target box in the current frame.

In certain embodiments, the analysis module 1010 is further configured to perform feature point extraction on an initial frame in the video frame sequence through a third thread, to obtain feature points of the initial frame.

In certain embodiments, the analysis module 1010 is further configured to perform feature point tracking on an i-th frame in the video frame sequence through the third thread based on the feature points of the initial frame, to obtain feature points of the i-th frame in the video frame sequence. The i-th frame is a video frame located after the initial frame, and a starting number of i is a frame number of the initial frame plus one.

In certain embodiments, the analysis module 1010 is further configured to perform feature point tracking on an (i+1)-th frame in the video frame sequence through the third thread based on the feature points of the i-th frame, to obtain feature points of the (i+1)-th frame in the video frame sequence.

In certain embodiments, the analysis module 1010 is further configured to perform optical flow tracking on the feature points of the i-th frame through the third thread, to obtain the feature points of the (i+1)-th frame in the video frame sequence.

In certain embodiments, the analysis module 1010 is further configured to delete a first feature point in the (i+1)-th frame in a case that the first feature point in the (i+1)-th frame meets a deletion condition. The deletion condition includes at least one of the following: the first feature point is a feature point that fails to be tracked; and a distance between the first feature point and an adjacent feature point is less than a distance threshold.

In certain embodiments, the analysis module 1010 is further configured to extract a new feature point from a target region in the (i+1)-th frame in a case that the target region meets a supplement condition. The supplement condition includes: the target region is a region in which a feature point tracking result is empty.

In conclusion, the foregoing apparatus divides the detection and the tracking into two threads. A detection algorithm does not affect a tracking frame rate. Even if a detection thread takes a long time, a terminal can still output the target box of each video frame. This method can output the target box of the video frame in real time, and the delay of the real-time output does not increase significantly as the quantity of the target boxes increases.

The foregoing apparatus further determines whether there are repetitive boxes in the current frame and merges the repetitive boxes, which ensures that the target boxes of the current frame are distinctive from each other and orderly, and avoids repetitive target boxes with the same function in the current frame.

The foregoing apparatus further implements the extraction for the initial frame and the feature point tracking for other frames. Besides, the apparatus improves the stability of feature points of adjacent frames by deleting and adding feature points, and ensures that the second thread can obtain the target box through the feature points of the adjacent frames.

Figure 13:
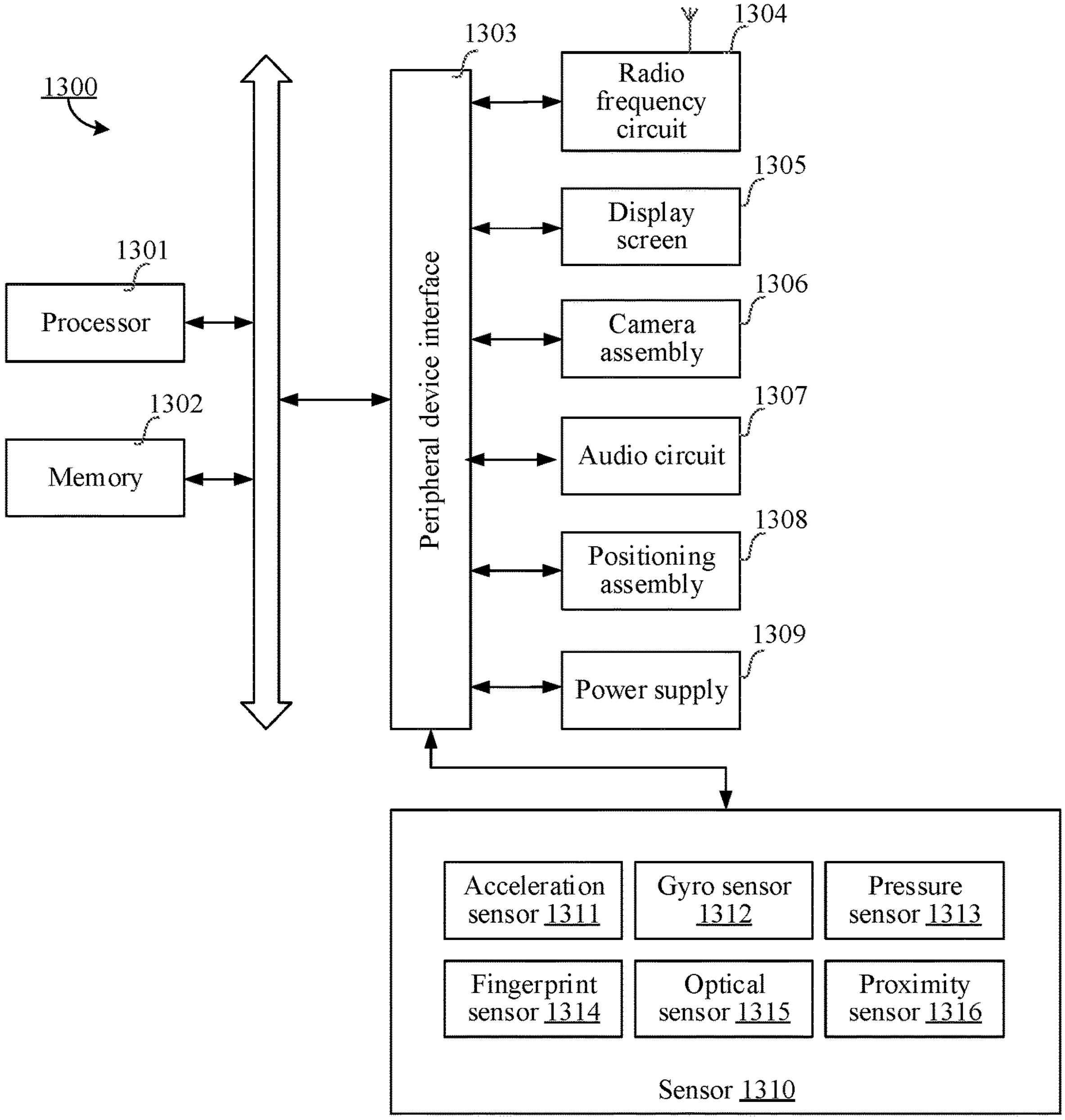
FIG. 13 is a structural block diagram illustrating an electronic device, according to an exemplary embodiment of this disclosure.

FIG. 13 is a structural block diagram illustrating an electronic device 1300 according to an exemplary embodiment of this disclosure. The electronic device 1300 may be a portable mobile terminal, such as: a smart phone, a tablet computer, a moving picture experts group audio layer III (MP3) player, a moving picture experts group audio layer IV (MP4) player, a notebook computer, or a desktop computer. The electronic device 1300 may also be referred to as another name such as user equipment, a portable terminal, a laptop terminal, or a desktop terminal.

Generally, the electronic device 1300 includes: a processor 1301 and a memory 1302.

The processor 1301 may include one or more processing cores, such as, a 4-core processor or an 8-core processor. The processor 1301 may be implemented by using at least one hardware form of a digital signal processor (DSP), a field-programmable gate array (FPGA), and a programmable logic array (PLA). The processor 1301 may alternatively include a main processor and a coprocessor. The main processor is a processor configured to process data in an active state, also referred to as a central processing unit (CPU). The coprocessor is a low-power processor configured to process data in a standby state. In some embodiments, the processor 1301 may be integrated with a graphics processing unit (GPU). The GPU is configured to render and draw content that needs to be displayed on a display screen. In some embodiments, the processor 1301 may further include an artificial intelligence (AI) processor. The AI processor is configured to process a computing operation related to machine learning.

The memory 1302 may include one or more computer-readable storage media that may be non-transitory. The memory 1302 may further include a high-speed random access memory (RAM), and a non-volatile memory such as one or more magnetic disk storage devices or flash storage devices. In some embodiments, the non-transient computer-readable storage medium in the memory 1302 is configured to store at least one instruction, and the at least one instruction is configured to be executed by the processor 1301 to implement the image repair method provided in the method embodiments of this disclosure.

In certain embodiments, the electronic device 1300 may further include a peripheral device interface 1303 and at least one peripheral device. The processor 1301, the memory 1302, and the peripheral device interface 1303 may be connected through a bus or a signal cable. Each peripheral device may be connected to the peripheral device interface 1303 through a bus, a signal cable, or a circuit board. The peripheral device includes: at least one of a radio frequency (RF) circuit 1304, a display screen 1305, a camera assembly 1306, an audio circuit 1307, a positioning assembly 1308, and a power supply 1309.

The peripheral device interface 1303 may be configured to connect at least one peripheral device related to input/output (I/O) to the processor 1301 and the memory 1302. In some embodiments, the processor 1301, the memory 1302, and the peripheral device interface 1303 are integrated on the same chip or the same circuit board. In some other embodiments, any or both of the processor 1301, the memory 1302, and the peripheral device interface 1303 may be implemented on an independent chip or a circuit board. This is not limited in this embodiment.

The RF circuit 1304 is configured to receive and transmit an RF signal, which is also referred to as an electromagnetic signal. The RF circuit 1304 communicates with a communication network and other communication devices through the electromagnetic signal. The RF circuit 1304 converts an electrical signal into an electromagnetic signal for transmission, or converts a received electromagnetic signal into an electrical signal. For example, the RF circuit 1304 includes: an antenna system, an RF transceiver, one or more amplifiers, a tuner, an oscillator, a digital signal processor, a codec chip set, a user identity module card, and the like. The RF circuit 1304 may communicate with other terminals by using at least one wireless communication protocol. The wireless communication protocol includes but is not limited to at least one of the following: a world wide web, a metropolitan area network, an intranet, generations of mobile communication networks (2G, 3G, 4G, and 5G), a wireless local area network, and a wireless fidelity (WiFi) network. In some embodiments, the RF circuit 1304 may further include a circuit related to near field communication (NFC). This is not limited in this disclosure.

The display screen 1305 is configured to display a user interface (UI). The UI may include a graphic, text, an icon, a video, and any combination thereof. When the display screen 1305 is a touch display screen, the display screen 1305 also has a capability to collect a touch signal on or above a surface of the display screen 1305. The touch signal may be input, as a control signal, to the processor 1301 for processing. In this case, the display screen 1305 may be further configured to provide at least one of a virtual button and a virtual keyboard, which is also referred to as a soft button and a soft keyboard. In some embodiments, there may be one display screen 1305, disposed on a front panel of the electronic device 1300. In some other embodiments, there may be at least two display screens 1305, disposed on different surfaces of the electronic device 1300 respectively or in a folded design. In still other embodiments, the display screen 1305 may be a flexible display screen, disposed on a curved surface or a folded surface of the electronic device 1300. Even, the display screen 1305 may be further set in a non-rectangular irregular graph, that is, a special-shaped screen. The display screen 1305 may be made of materials such as a liquid crystal display (LCD), an organic light-emitting diode (OLED), or the like.

The camera assembly 1306 is configured to collect an image or a video. For example, the camera assembly 1306 includes a front-facing camera and a rear-facing camera. Generally, the front-facing camera is arranged on a front panel of the terminal, and the rear-facing camera is arranged on a rear surface of the terminal. In some embodiments, there are at least two rear-facing cameras, which are respectively any of a main camera, a depth-of-field camera, a wide-angle camera, and a telephoto camera, to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera assembly 1306 may further include a flashlight. The flash may be a single color temperature flash, or may be a double color temperature flash. The double color temperature flash refers to a combination of a warm light flash and a cold light flash, and may be used for light compensation under different color temperatures.

The audio circuit 1307 may include a microphone and a speaker. The microphone is configured to collect sound waves of a user and an environment, and convert the sound waves into an electrical signal and input to the processor 1301 for processing, or input to the RF circuit 1304 to implement voice communication. For the purpose of stereo sound collection or noise reduction, there may be a plurality of microphones, respectively arranged at different parts of the electronic device 1300. The microphone may further be an array microphone or an omni-directional collection type microphone. The speaker is configured to convert electric signals from the processor 1301 or the RF circuit 1304 into sound waves. The speaker may be a conventional thin-film speaker or a piezoelectric ceramic speaker. When the speaker is the piezoelectric ceramic speaker, the electrical signals not only may be converted into sound waves that can be heard by human, but also may be converted into sound waves that cannot be heard by human for ranging and the like. In some embodiments, the audio circuit 1307 may further include a headphone jack.

The positioning assembly 1308 is configured to position a current geographic location of the electronic device 1300, to implement a navigation or a location based service (LBS). The positioning assembly 1308 may be a positioning assembly based on the global positioning system (GPS) of the United States, the BeiDou System of China, and the GALILEO System of Russia.

The power supply 1309 is configured to supply power to assemblies in the electronic device 1300. The power supply 1309 may be an alternating current, a direct current, a disposable battery, or a rechargeable battery. In a case that the power supply 1309 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the electronic device 1300 further includes one or more sensors 1310. The one or more sensors 1310 include but are not limited to an acceleration sensor 1311, a gyro sensor 1312, a pressure sensor 1313, a fingerprint sensor 1314, an optical sensor 1315, and a proximity sensor 1316.

The acceleration sensor 1311 may detect magnitudes of acceleration on three coordinate axes of a coordinate system established by the electronic device 1300. For example, the acceleration sensor 1311 may be configured to detect components of gravity acceleration on the three coordinate axes. The processor 1301 may control, according to a gravity acceleration signal collected by the acceleration sensor 1311, the display screen 1305 to display the UI in a landscape view or a portrait view. The acceleration sensor 1311 may be further configured to collect motion data of a game or a user.

The gyro sensor 1312 may detect a body direction and a rotation angle of the electronic device 1300. The gyro sensor 1312 may cooperate with the acceleration sensor 1311 to collect a 3D action by the user on the electronic device 1300. The processor 1301 may implement the following functions according to the data collected by the gyro sensor 1312: motion sensing (such as, change of the UI based on a tilt operation of the user), image stabilization during photographing, game control, and inertial navigation.

The pressure sensor 1313 is arranged on a lower layer of at least one of the following of the electronic device 1300: a side frame and the display screen 1305. When the pressure sensor 1313 is arranged at the side frame of the electronic device 1300, a holding signal of the user on the electronic device 1300 may be detected. Left and right hand identification or a quick operation may be performed by the processor 1301 according to the holding signal collected by the pressure sensor 1313. When the pressure sensor 1313 is arranged on the lower layer of the display screen 1305, the processor 1301 controls, according to a pressure operation of the user on the display screen 1305, an operable control on the UI interface. The operable control includes at least one of a button control, a scroll-bar control, an icon control, and a menu control.

The fingerprint sensor 1314 is configured to collect a fingerprint of the user, and the processor 1301 recognizes an identity of the user according to the fingerprint collected by the fingerprint sensor 1314, or the fingerprint sensor 1314 recognizes the identity of the user according to the collected fingerprint. When recognizing that the identity of the user is a trusted identity, the processor 1301 authorizes the user to perform related sensitive operations. The sensitive operations include unlocking a screen, viewing encrypted information, downloading software, paying, changing a setting, and the like. The fingerprint sensor 1314 may be arranged on a front face, a back face, or a side face of the electronic device 1300. When a physical button or a vendor logo is arranged on the electronic device 1300, the fingerprint sensor 1314 may be integrated together with the physical button or the vendor logo.

The optical sensor 1315 is configured to collect ambient light intensity. In some embodiments, the processor 1301 may control display luminance of the display screen 1305 according to the ambient light intensity collected by the optical sensor 1315. When the ambient light intensity is relatively high, the display luminance of the display screen 1305 is increased. When the ambient light intensity is relatively low, the display luminance of the display screen 1305 is reduced. In another embodiment, the processor 1301 may further dynamically adjust a photographing parameter of the camera assembly 1306 according to the ambient light intensity collected by the optical sensor 1315.

The proximity sensor 1316, also referred to as a distance sensor, is usually arranged on the front panel of the electronic device 1300. The proximity sensor 1316 is configured to collect a distance between the user and the front face of the electronic device 1300. In some embodiments, when the proximity sensor 1316 detects that the distance between the user and the front surface of the electronic device 1300 gradually becomes small, the display screen 1305 is controlled by the processor 1301 to switch from a screen-on state to a screen-off state. When the proximity sensor 1316 detects that the distance between the user and the front surface of the electronic device 1300 gradually becomes large, the display screen 1305 is controlled by the processor 1301 to switch from the screen-off state to the screen-on state.

A person skilled in the art will understand that a structure shown in FIG. 13 constitutes no limitation on the electronic device 1300, and the electronic device may include more or fewer assemblies than those shown in the figure, or some assemblies may be combined, or a different assembly deployment may be used.

Certain embodiments of this disclosure further provide a computer-readable storage medium, storing at least one instruction, at least one program, a code set or an instruction set. The at least one instruction, the at least one program, the code set or the instruction set is loaded and executed by a processor to implement the detection and tracking method provided in the foregoing method embodiments.

Certain embodiments of this disclosure provide a computer program product or a computer program, including computer instructions, the computer instructions being stored in a computer-readable storage medium. A processor of a computer device reads the computer instructions from the computer-readable storage medium, and executes the computer instructions, causing the computer device to implement the detection and tracking method provided in the foregoing method embodiments.

The sequence numbers of the foregoing embodiments of this disclosure are merely for description and do not imply the preference of the embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be: a read-only memory, a magnetic disk, an optical disc, or the like.

The foregoing descriptions are merely exemplary embodiments and implementations of this disclosure, and are not intended to limit this disclosure. Any modification, equivalent replacement, or improvement made within the spirit and principle of this disclosure shall fall within the protection scope of this disclosure. Additionally, for a person of ordinary skill in the art, several transformations and improvements can be made without departing from the idea of the disclosure, which also belong to the protection scope of the disclosure.

What is claimed is:

1. A detection and tracking method, performed by at least one processor, the method comprising:

performing feature point analysis on a video frame sequence, to obtain feature points on each video frame in the video frame sequence;

performing target detection on an extracted frame through a first thread based on the feature points, to obtain a target box in the extracted frame, the extracted frame being a video frame extracted in the video frame sequence with at least one frame skipped between the extracted frame and another video frame of the video frame sequence, an amount of skipping being based on a target step size;

performing target box tracking in a current frame through a second thread based on the feature points and the target box in the extracted frame, to obtain a result target box in the current frame; and outputting the result target box in the current frame, wherein performing of the target box tracking in the current frame comprises, when the first thread outputs a first target box detected in a latest extracted frame before the current frame, tracking the first target box and a second target box tracked in a previous frame of the current frame in the current frame through the second thread based on the feature points, to obtain the result target box in the current frame.

2. The method according to claim 1, wherein the tracking of the first target box and the second target box in the current frame through the second thread comprises:

tracking the first target box in the current frame through the second thread based on the feature points, to obtain a first tracking box;

tracking the second target box in the current frame through the second thread based on the feature points, to obtain a second tracking box; and when the first tracking box and the second tracking box are determined to be repetitive in the current frame, merging the first tracking box and the second tracking box, to obtain the result target box in the current frame.

3. The method according to claim 2, wherein the first tracking box and the second tracking box are determined to be repetitive based on an intersection over union (IoU) of the first tracking box and the second tracking box being greater than an IoU threshold.

4. The method according to claim 3, wherein the first tracking box and the second tracking box are determined to be repetitive further based on types of the first tracking box and the second tracking box being the same.

5. The method according to claim 2, wherein the merging of the first tracking box and the second tracking box comprises at least one of:

determining the first tracking box to be the result target box;

determining a tracking box with a greatest confidence score of the first tracking box and the second tracking box to be the result target box; and when the first tracking box is at a boundary of the current frame, determining the second tracking box to be the result target box.

6. The method according to claim 1, wherein the tracking of the second target box in the current frame comprises:

acquiring tracking feature points of the current frame and target feature points of the previous frame of the current frame;

forming the tracking feature points of the current frame and the target feature points of the previous frame into a plurality of sets of feature point matching pairs through the second thread, the target feature points being feature points located in the second target box;

determining a plurality of sets of feature point offset vectors of the plurality of sets of feature point matching pairs;

calculating a target box offset vector of the second target box based on the plurality of sets of feature point offset vectors; and shifting the second target box according to the target box offset vector.

7. The method according to claim 1, wherein the performing of the feature point analysis on the video frame sequence comprises:

performing feature point extraction on an initial frame in the video frame sequence through a third thread, to obtain feature points of the initial frame;

performing feature point tracking on an i-th frame in the video frame sequence through the third thread based on the feature points of the initial frame, to obtain feature points of the i-th frame in the video frame sequence, the i-th frame being a video frame subsequent to the initial frame in the video frame sequence, a starting number of i being one greater than a frame number of the initial frame; and performing feature point tracking on an (i+1)-th frame in the video frame sequence through the third thread based on the feature points of the i-th frame, to obtain feature points of the (i+1)-th frame in the video frame sequence.

8. The method according to claim 7, wherein the feature point tracking performed on the (i+1)-th frame in the video frame sequence includes an optical flow tracking on the feature points of the i-th frame.

9. The method according to claim 7, further comprising:

deleting a first feature point in the (i+1)-th frame when the first feature point in the (i+1)-th frame meets a deletion condition, the deletion condition comprising at least one of:

the first feature point being a feature point that fails to be tracked, and a distance between the first feature point and an adjacent feature point being less than a distance threshold.

10. The method according to claim 7, further comprising:

extracting a new feature point from a target region in the (i+1)-th frame in a case that the target region meets a supplement condition, the supplement condition comprising the target region being a region in which a feature point tracking result is empty.

11. A detection and tracking apparatus, comprising:

at least one memory configured to store computer program code; and at least one processor configured to operate as instructed by the computer program code, the computer program code including:

analysis code configured to cause the at least one processor to perform feature point analysis on a video frame sequence, to obtain feature points on each video frame in the video frame sequence, detection code configured to cause the at least one processor to perform target detection on an extracted frame through a first thread based on the feature points, to obtain a target box in the extracted frame, the extracted frame being a video frame extracted in the video frame sequence with at least one frame skipped between the extracted frame and another video frame of the video frame sequence, an amount of skipping being based on a target step size, tracking code configured to cause the at least one processor to perform target box tracking in a current frame through a second thread based on the feature points and the target box in the extracted frame, to obtain a result target box in the current frame, and output code configured to cause the at least one processor to output the result target box in the current frame, wherein the tracking code is further configured to cause the at least one processor to, when the first thread outputs a first target box detected in a latest extracted frame before the current frame, track the first target box and a second target box tracked in a previous frame of the current frame in the current frame through the second thread based on the feature points, to obtain the result target box in the current frame.

12. The apparatus according to claim 11, wherein the tracking code is further configured to cause the at least one processor to:

track the first target box in the current frame through the second thread based on the feature points, to obtain a first tracking box;

track the second target box in the current frame through the second thread based on the feature points, to obtain a second tracking box; and when the first tracking box and the second tracking box are determined to be repetitive in the current frame, merge the first tracking box and the second tracking box, to obtain the result target box in the current frame.

13. The apparatus according to claim 12, wherein the first tracking box and the second tracking box are determined to be repetitive based on:

an intersection over union (IoU) of the first tracking box and the second tracking box being greater than an IoU threshold, and types of the first tracking box and the second tracking box being the same.

14. The method according to claim 12, wherein the tracking code is further configured to cause the at least one processor to perform at least one of:

determining the first tracking box to be the result target box;

determining a tracking box with a greatest confidence score of the first tracking box and the second tracking box to be the result target box; and when the first tracking box is at a boundary of the current frame, determining the second tracking box to be the result target box.

15. The apparatus according to claim 11, wherein the tracking code is further configured to cause the at least one processor to:

acquire tracking feature points of the current frame and target feature points of the previous frame of the current frame;

form the tracking feature points of the current frame and the target feature points of the previous frame into a plurality of sets of feature point matching pairs through the second thread, the target feature points being feature points located in the second target box;

determine a plurality of sets of feature point offset vectors of the plurality of sets of feature point matching pairs;

calculate a target box offset vector of the second target box based on the plurality of sets of feature point offset vectors; and shift the second target box according to the target box offset vector.

16. The apparatus according to claim 11, wherein the analysis code is further configured to cause the at least one processor to:

perform feature point extraction on an initial frame in the video frame sequence through a third thread, to obtain feature points of the initial frame;

perform feature point tracking on an i-th frame in the video frame sequence through the third thread based on the feature points of the initial frame, to obtain feature points of the i-th frame in the video frame sequence, the i-th frame being a video frame subsequent to the initial frame in the video frame sequence, a starting number of i being one greater than a frame number of the initial frame, the feature point tracking including an optical flow tracking on the feature points of the i-th frame; and perform feature point tracking on an (i+1)-th frame in the video frame sequence through the third thread based on the feature points of the i-th frame, to obtain feature points of the (i+1)-th frame in the video frame sequence.

17. The apparatus according to claim 16, wherein the analysis code is further configured to cause the at least one processor to:

delete a first feature point in the (i+1)-th frame when the first feature point in the (i+1)-th frame meets a deletion condition, the deletion condition comprising at least one of:

the first feature point being a feature point that fails to be tracked; and a distance between the first feature point and an adjacent feature point being less than a distance threshold; and extract a new feature point from a target region in the (i+1)-th frame in a case that the target region meets a supplement condition, the supplement condition comprising the target region being a region in which a feature point tracking result is empty.

18. A non-transitory computer-readable storage medium, storing a computer program that, when executed by at least one processor, causes the at least one processor to:

perform feature point analysis on a video frame sequence, to obtain feature points on each video frame in the video frame sequence;

perform target detection on an extracted frame through a first thread based on the feature points, to obtain a target box in the extracted frame, the extracted frame being a video frame extracted in the video frame sequence with at least one frame skipped between the extracted frame and another video frame of the video frame sequence, an amount of skipping being based on a target step size;

perform target box tracking in a current frame through a second thread based on the feature points and the target box in the extracted frame, to obtain a result target box in the current frame; and output the result target box in the current frame, wherein performing of the target box tracking in the current frame comprises, when the first thread outputs a first target box detected in a latest extracted frame before the current frame, tracking the first target box and a second target box tracked in a previous frame of the current frame in the current frame through the second thread based on the feature points, to obtain the result target box in the current frame.

* * * * *